US012792486B2

(12) United States Patent
Governatori et al.

(10) Patent No.: US 12,792,486 B2
(45) Date of Patent: Nov. 10, 2026

(54) LOG DATA COMPLIANCE

(71) Applicant: Commonwealth Scientific and Industrial Research Organisation, Acton (AU)

(72) Inventors: Guido Governatori, Acton (AU); Nick Van Beest, Acton (AU); Adrian Cryer, Acton (AU); Heerko Groefsema, Groningen (NL)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 268 days.

(21) Appl. No.: 18/009,503

(22) PCT Filed: Jun. 10, 2021

(86) PCT No.: PCT/AU2021/050596
§ 371 (c)(1),
(2) Date: Dec. 9, 2022

(87) PCT Pub. No.: WO2021/248201
PCT Pub. Date: Dec. 16, 2021

(65) Prior Publication Data

US 2023/0244590 A1 Aug. 3, 2023

(30) Foreign Application Priority Data

Jun. 11, 2020 (AU) ................................ 2020901929

(51) Int. Cl.
*G06F 11/34* (2006.01)
*G06F 17/40* (2006.01)

(52) U.S. Cl.
CPC .......... *G06F 11/3476* (2013.01); *G06F 17/40* (2013.01); *G06F 2201/86* (2013.01)

(58) Field of Classification Search
CPC ................. G06F 11/3476; G06F 17/40; G06F 2201/86; G06Q 10/0635; G06Q 10/0639
See application file for complete search history.

(56) References Cited

U.S. PATENT DOCUMENTS

2006/0206612 A1* 9/2006 Ferro ................. G06F 11/3495 709/227
2007/0271573 A1* 11/2007 Chandrasekaran ..... G06F 9/542 719/318

(Continued)

FOREIGN PATENT DOCUMENTS

AU 2016204072 A1 1/2017
CN 110851471 A 2/2020

OTHER PUBLICATIONS

Robert et al., On-line Monitoring of Real Time Applications for Early Error Detection, IEEE, 2008 (Year: 2008).*

(Continued)

*Primary Examiner* — Kyle R Quigley

(57) ABSTRACT

This disclosure relates to a computer analysing log data. The computer receives log data comprising traces having log events from respective process executions. The computer creates a stream of log events, wherein the stream is sorted by the event time. The computer iterates over the stream of log events, and for each log event, executes update functions that define updates of a set of variables based on the log events. The set of variables comprises at least one cross-trace variable to calculate an updated value of the set of variables. The update functions define updates of the cross-trace variable in response to the log events of the traces. The computer further executes evaluation functions on the set of variables to determine compliance in relation to the log data based on the updated value. The evaluation functions represent compliance rules based on the set of variables including the cross-trace variable.

20 Claims, 7 Drawing Sheets

(56) References Cited

U.S. PATENT DOCUMENTS

| | | | | |
|---|---|---|---|---|
| 2019/0108112 | A1* | 4/2019 | Kannan | G06F 11/3476 |
| 2020/0042422 | A1 | 2/2020 | Togawa | |
| 2020/0076852 | A1* | 3/2020 | Klaedtke | G06F 9/542 |

OTHER PUBLICATIONS

Written Opinion of the International Searching Authority dated Aug. 2, 2021 in connection with PCT/AU2021/050596.
International Search Report dated Aug. 2, 2021 in connection with PCT/AU2021/050596.
International Type Search Report dated Aug. 12, 2020 in connection with Australian Application No. 2020901929.
Mustafa, "Evaluating business process compliance management frameworks", Diss. Queensland University of Technology, 2015.
Ly, "SeaFlows—a compliance checking framework for supporting the process lifecycle", Diss. Universität Ulm, 2013.
Sadiq et al., "Modeling control objectives for business process compliance", International conference on business process management, 2007.
Adriansyah et al., "Towards robust conformance checking", International Conference on Business Process Management, 2010.
Roudjane et al., "Real-time data mining for event streams", 2018 IEEE 22nd International Enterprise Distributed Object Computing Conference (EDOC), IEEE, 2018.

* cited by examiner

| Process id | Event id | Event label | Timestamp | Lifecycle | ... |
|---|---|---|---|---|---|
| 1 | $e_0$ | A | $t_0$ | start | ... |
| 1 | $e_1$ | A | $t_1$ | complete | ... |
| 1 | $e_2$ | B | $t_4$ | start | ... |
| 1 | $e_3$ | B | $t_6$ | complete | ... |
| 1 | $e_4$ | C | $t_9$ | start | ... |
| 1 | $e_5$ | C | $t_{11}$ | complete | ... |

| | | | | | |
|---|---|---|---|---|---|
| 2 | $e_6$ | A | $t_2$ | start | ... |
| 2 | $e_7$ | A | $t_3$ | complete | ... |
| 2 | $e_8$ | B | $t_5$ | start | ... |
| 2 | $e_9$ | C | $t_7$ | start | ... |
| 2 | $e_{10}$ | C | $t_{12}$ | complete | ... |
| 2 | $e_{11}$ | B | $t_{14}$ | complete | ... |

| | | | | | |
|---|---|---|---|---|---|
| 3 | $e_{12}$ | A | $t_8$ | start | ... |
| 3 | $e_{13}$ | A | $t_{10}$ | complete | ... |
| 3 | $e_{14}$ | C | $t_{13}$ | start | ... |
| 3 | $e_{15}$ | C | $t_{15}$ | complete | ... |
| 3 | $e_{16}$ | B | $t_{16}$ | start | ... |
| 3 | $e_{17}$ | B | $t_{17}$ | complete | ... |

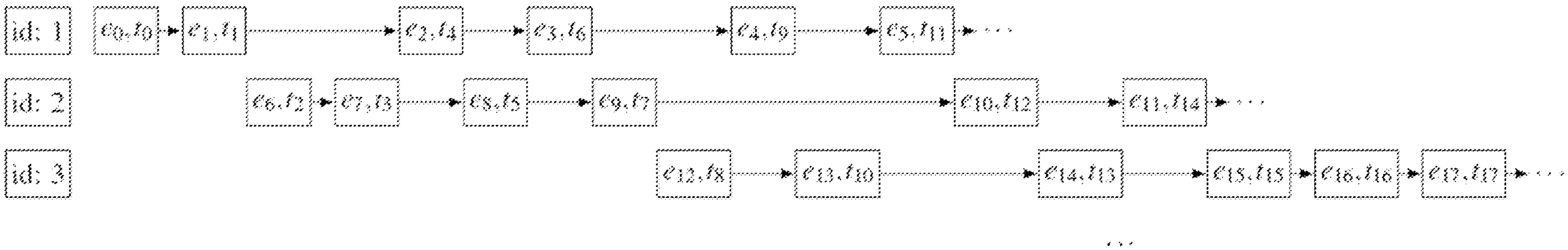
Fig. 5
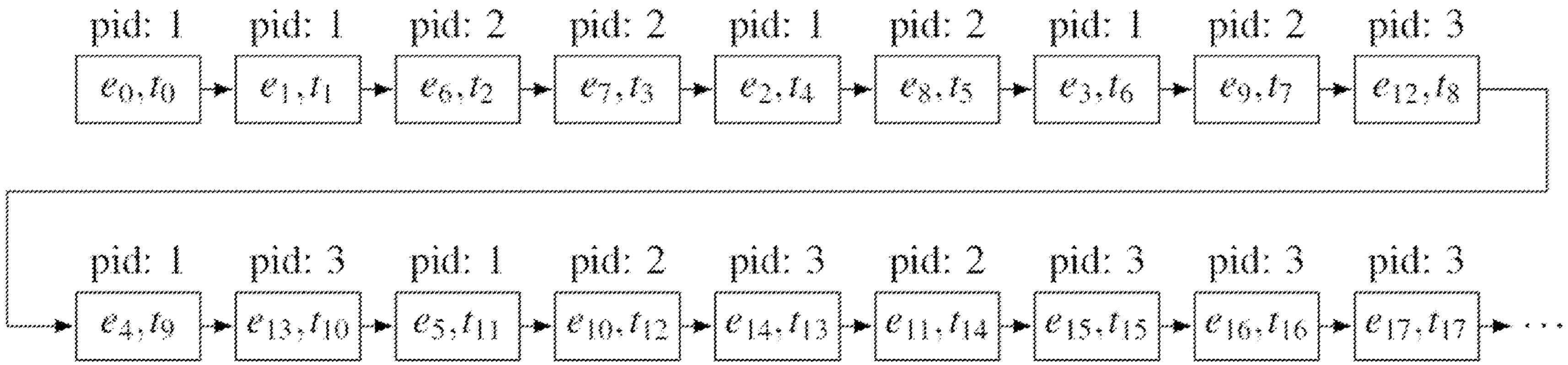
Fig. 6
| Vars | States | | | | | | | | | | | |
|---|---|---|---|---|---|---|---|---|---|---|---|---|
| | $e_0 : t_0$ | $e_1 : t_1$ | $e_6 : t_2$ | $e_7 : t_3$ | $e_2 : t_4$ | $e_8 : t_5$ | $e_3 : t_6$ | $e_9 : t_7$ | $e_{12} : t_8$ | $e_4 : t_9$ | $e_{13} : t_{10}$ | ... |
| $X_0$ | 0 | 0 | 0 | 0 | 1 | 2 | 1 | 1 | 1 | 1 | 1 | ... |
| $X_1$ | 0 | 2 | 2 | 6 | 6 | 6 | 6 | 6 | 6 | 6 | 14 | ... |
| $X_2$ | 0 | 0 | 0 | 0 | 2 | 6 | 6 | 6 | 6 | 6 | 6 | ... |
Fig. 7

LOG DATA COMPLIANCE

TECHNICAL FIELD

This disclosure relates to analysing log data and more specifically, to methods and systems for analysing log data.

BACKGROUND

Technical systems are becoming more and more complex in the number of operations that they perform as well as the number of interacting modules they contain. While it is possible to define the behaviour of each module, it is difficult to check, at runtime, that all modules together perform as expected. For example, some modules may access shared resources, such as database servers or a cryptographic public keys. As a result, compliance of the entire system depends on the temporal aspects of the behaviour of each module.

Some approaches primarily focus on conformance checking instead of compliance checking: the behaviour as recorded in the event log is evaluated against the intended behaviour as specified in a process model. With compliance checking, on the other hand, the behaviour is checked with the behaviour as required by a set of rules stemming from regulations. As a result, an execution of a process can be compliant but not conformant (i.e. the behaviour is not in the model, but does not violate any of the rules) or conformant but not compliant (the observed behaviour is allowed by the model but violates one or more rules).

For example, the system may be compliant if module A accesses the public key storage before module B but not if module B access the public key storage before module A. If rules are encoded directly for such scenarios, the number of potential combinations quickly exceed practical constraints as the number of potential scenarios can grow combinatorically, also referred to as "combinatorial explosion". Due to this explosion, it is difficult, if not impossible to design compliance checkers. Therefore, there is a need for methods and systems that can analyse log data, potentially from many different processes, in an efficient manner. It may be particularly useful, if complexity is reduced to a point where a compliance checker can check for compliance before the next event occurs, so that real-time monitoring becomes possible.

It is noted that the terms 'rules' and 'regulations' herein do not necessarily relate to legal or statutory rules, but may also relate to technical requirements, such as limits on the capabilities of a physical system. That is, compliance checking provides the assurance that the physical system, with its limited resources, is able to safely perform the desired functions from different sources without overloading the system or risking malfunctioning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

A method for analysing log data comprises:

receiving log data comprising traces having multiple log events from multiple different respective process executions, each of the multiple log events being associated with an event time;

creating a single stream of log events comprising the multiple log events from the multiple respective different process executions, wherein the single stream of log events is sorted by the associated event time;

iterating over the single stream of log events, and for each log event, executing one or more update functions that define updates of a set of variables based on the log events, the set of variables comprising at least one cross-trace variable to calculate an updated value of one or more of the set of variables, wherein the one or more update functions define updates of the at least one cross-trace variable in response to the log events of more than one of the traces; and executing one or more evaluation functions on the set of variables to determine compliance in relation to the log data based on the updated value, the one or more evaluation functions representing compliance rules based on the set of variables including the cross-trace variable.

It is an advantage that there is a set of variables that is updated by the update functions, and then the evaluation functions test these variables. This allows efficient checking of cross-process compliance, where otherwise temporal dependencies would make the direct processing of the potentially fully connected evaluation graph computationally difficult, with a potentially combinatorial complexity.

The method may comprise executing the one or more evaluation functions for each log event. The method may comprise performing the steps of creating, iterating and executing in real-time to determine compliance while receiving further log data.

The compliance rules may comprise a conditional obligation. The compliance rules may be defined across multiple processes. The update functions may define an update of one of the set of variables in response to log data from multiple processes or multiple process instances.

The log data may comprise log data generated by a computer system executing an operating system. The log data may be generated by different processes executed by the operating system. The multiple log events may comprise start log events that indicate the beginning of a task and stop events that indicate the end of a task.

The set of variables may be indicative of a number of currently active tasks. The one or more update functions may increment one of the set of variables in response to one of the multiple log events being a start log event; and the one or more update functions may decrement one of the set of variables in response to one of the multiple log events being a stop log event.

The one or more evaluation functions may be based on an upper threshold of one of the set of variables. The one or more evaluation functions may be represented by evaluation predicates. The evaluation predicates may be associated with a logical value indicating a predetermined occurrence of log events. The evaluation predicates may be defined on graph-like structures. The graph-like structures may define a precedence among the evaluation predicates.

The method may further comprise determining a set of evaluation functions that require execution based on the graph structure and executing only the set of evaluation functions in that iteration.

The graph structure may represent a combination of the state that has been checked and the evaluation functions that require execution.

The method may further comprise:

generating an instance of an update function or evaluation function or both to represent a rule;

storing the generated instance in volatile computer memory;

executing the generated instance in the volatile computer memory; and discarding or overwriting the generated instance in the volatile computer memory while further determining compliance.

The method may further comprise determining compliance of multiple traces in parallel against multiple rules.

The evaluation functions may represent an in-force time interval defined by the rules.

Software, when installed on a computer, causes the computer to perform the above method.

A computer system for monitoring compliance of another system by analysing log data, comprises a processor configured to:

receive the log data comprising traces having multiple log events from multiple respective different process execution, each of the multiple log events being associated with an event time;

create a single stream of log events comprising the multiple log events from the multiple respective different process executions, wherein the single stream of log events is sorted by the associated event time;

iterate over the single stream of log events, and for each log event, executing one or more update functions that define updates of a set of variables based on the log events, the set of variables comprising at least one cross-trace variable to calculate an updated value of one or more of the set of variables, wherein the one or more update functions define updates of the at least one cross-trace variable in response to the log events of more than one of the traces; and execute one or more evaluation functions on the set of variables to determine compliance in relation to the log data based on the updated value, the one or more evaluation functions representing compliance rules based on the set of variables including the cross-trace variable.

BRIEF DESCRIPTION OF DRAWINGS

An example will now be described with reference to the following figures:

FIG. 5 provides a graphical overview of the sequentialised events of the event log depicted in FIG. 1.

FIG. 6 illustrates the events from FIG. 5 as a single trace.

FIG. 7 illustrates an example excerpt of the evolution of the variables after each replayed event.

DESCRIPTION OF EMBODIMENTS

Application Domains

Figure 1:
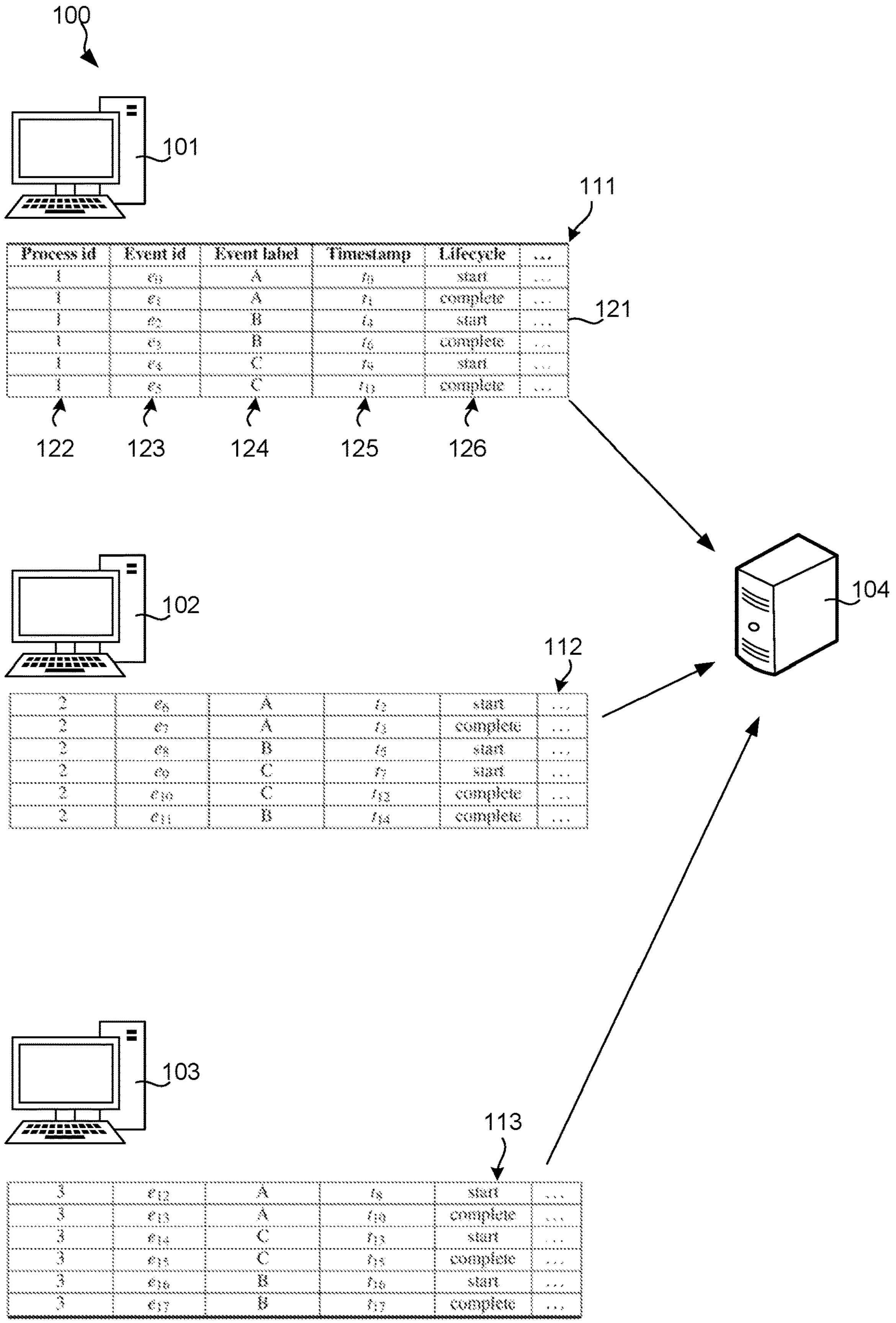
FIG. 1 illustrates a computer network comprising log event generating computers and a log processing server.

Methods disclosed herein can be applied to a ranged of different application domains. In particular, the disclosed methods analyse log data that comprises traces. Each trace has multiple log events from multiple different respective process executions. That is, each trace has log events generated by one process execution. A process execution may also be considered as a process instance. For example, in an operating system, a compiled software program may be stored on program memory as a binary file and the steps for the processor to execute are considered as a process. When the processor executes the binary file, the processor assigns a process identifier to that execution. That is, the processor creates an instance of the process. In that sense, there can be multiple instances of the same process. For example, there can be two instances of an Apache webserver being executed by the same processor, each with their respective process identifier.

These process executions are listed separately as an output of admin tools, such as ps in UNIX based system of Task Manager in Microsoft Windows based systems. Each of these executions write to their own separate log file or write into the same common log file with process identifiers added to each log event. It can be appreciated, that the number of log events from multiple process executions can be significant.

Further, it is important to check compliance of the process executions for detecting abnormalities. These compliance checks are more relevant and more robust, if they check compliance across multiple process executions instead of only for each process execution individually. For example, it is possible that each of the multiple webservers mentioned above are compliant individually, but they breach monitoring rules that are defied for both servers together. However, checking compliance across different process executions, that is, across traces, leads to a combinatorial complexity that is difficult to handle with existing computer hardware. Additionally, direct implementation of cross-trace compliance checking using existing well-known computer functions, would result in program code that requires more random access memory (RAM) that is typically available in current computer architectures. Therefore, the disclosed methods reduces the computational complexity and potentially the amount of RAM that is required for cross-trace compliance checking.

In other examples, the process executions are of a physical nature, such as manufacturing processes. This is becoming an increasingly pressing problem under the label "Industry 4.0", which relates to data-driven industry. While a huge amount of data on manufacturing processes is being collected, it is difficult to check this data for compliance given the computational complexity for cross-trace compliance checking. For example, in vehicle manufacturing, there may be a process for pressing door panels and a process for pressing bonnet panels. The executions of both of these can be checked separately. However, both processes may share the same press, or share the same transport robot. Therefore, there is a need for a cross-trace compliance check. However, cross-trace compliance checking presents a difficult combinatorial problem that is addressed by the disclosed methods.

Computer Network

FIG. 1 illustrates a computer network 100 comprising three computers 101, 102 and 103 which each execute their own processes. Computer network 100 further comprises a log processing server 104. In this example, each computer 101, 102, 103 executes one process with identifiers (IDs) 1, 2, 3, respectively and sends generated event logs to log processing server 104. Each of these processes generate log events, which are shown in individual logs 111, 112, 113, respectively. So the term 'event log' refers to a collection of 'log events'.

Each computer 101, 102, 103 may store event logs 111, 112, 113 locally as shown in FIG. 1 and then send them as to log processing server 104. In other examples, computers 101, 102, 103 'stream' log events in the sense that every new log event is sent directly to log processing server 104 without local collection. In other examples, computers 101, 102, 103 may be replaced by other agents that execute log-generating processes, such as processors executing binaries, or virtual machines operating on a shared resource. Server 104 may also be implemented as a process on a single computer system or processor together with computers 101, 102 and 103 or on a cloud computing environment. When log processing server 104 receives the log events in event logs 111, 112, 113, server 104 may combine them into one table, or collection of event log.

Log Events

Each log event, such as example log event 121, comprises a process ID 122, Event ID 123, event label 124, timestamp 125 and lifecycle 126. In other examples, the event logs 111, 112, 113 may have different columns or a different structure.

It is noted here that the process ID remains unchanged as the log events are generated by the same process executed by a respective computer. In other examples, however, each computer may generate events with different process IDs if the computer executes multiple processes. The event ID is here labelled with a sequential index but computer 102 does not know which index computer 101 has last used, so the event IDs shown in FIG. 1 are simply for illustrative purposes. They may be chosen as unique labels, such as a random number, or they may be an auto-increment integer starting from '0' for each computer 101, 102, 103 and prefixed by a computer or processor ID. The event label 124 is a label that uniquely identifies an event or a 'task'. In this regard, a log event relates to an execution instance of a task and the event label refers to a definition of that task. So computer 101 has two log events corresponding to each of tasks 'A', 'B', 'C', marking the start and end of each of these tasks. It is noteworthy that computers 102 and 103 generate instances of the same tasks, so they also have 'A', 'B', 'C' in their event logs.

The timestamp used in FIG. 1 is such that the index oft represents a point in time, which could be seconds or milliseconds. So for example, the first event in log 111 has occurred at 0 ms (index '0' of) $t_0$, while the first event in log 112 has occurred at 2 ms (index '2' of $t_2$). In other examples, the timestamp is a UNIX timestamp or other timestamp. The lifecycle indicates whether the event of label 124 has started or completed. Lifecycle column 126 may hold one of more than two states (e.g., 'start, 'complete', 'terminated', 'aborted', 'suspended', 'resumed', etc.) or may not be used at all.

More specifically, events are recordings of important milestones in the execution of information systems. They may contain, for example, recordings of information regarding tasks in business processes, the creation and alterations of artefacts of that business process, the task or artefact ID, the time at which the event was triggered, and the resource involved in triggering the event. An event occurrence within a trace consists of a set of data variables relevant to that event. Given a trace, the same data variables can appear and change over multiple event occurrences. In addition, there are variables that hold on a trace/instance level. A log event (or simply 'event') may be defined formally as follows (but different definitions may be used):

Definition 1 (Event) An event $e \in E$ is a tuple $e=z,\langle D,vz,\rangle$ such that: D is a set of data variables such that $\{id, timestamp, state, resource\} \subseteq D$, and v is a function v: $D \rightarrow d(x)$ that obtains the value of the variable $x \in D$, where d(x) denotes the domain of x.

Event Log

Given a set of events, an event log consists of a set of traces, each containing the sequence of events produced by one execution of a process. Events in an event log are related via a total order induced by their timestamps. In other words, server 104 sorts the evert log by the timestamps. Sorting may be achieved by entering the events into a linked tree data structure of the Java language, noting that many other implementations in other programming languages are possible. In this context, the terms 'ordering' and 'sorting' are used synonymously. An event log may be defined formally as follows (but different definitions may be used):

Definition 2 (Event log, Trace) Let L be an event log and E a set of event occurrences. An event trace $\sigma \in L$ is defined in terms of an order $O_\sigma=[0,n-1]$ and $\alpha$ set of events $E_\sigma \subseteq E$ with $|E_\sigma|=n$ such that $\sigma=e_0 e_1 \ldots e_{n-1}$ is a sequence of events with $\forall i \in O_\sigma: e_i \in E_\sigma$, and $\forall i, j \in O_\sigma: v_{e_j}(\text{timestamp}) \leq v_{e_j}(\text{timestamp})_{iff}\ i \leq j$.

An example of an event log L is provided in FIG. 1. Every trace is a sequence, where every event has a unique identifier ($e_i$), an event label (e.g. A), a timestamp ($t_k$) and a lifecycle event (start, complete) In reallife event logs, there are typically much more event properties (i.e. variables) recorded with each event, but these are omitted in FIG. 1 for readability purposes.

Event properties here could be the customer ID, order amount, approval etc. The values for each of these variables may be altered by a subsequent event. Certain variables are trace specific, whereas others are valid across traces (e.g. total order amount a manager has to approve, total cases under investigation for a certain resource etc.).

Figure 2:
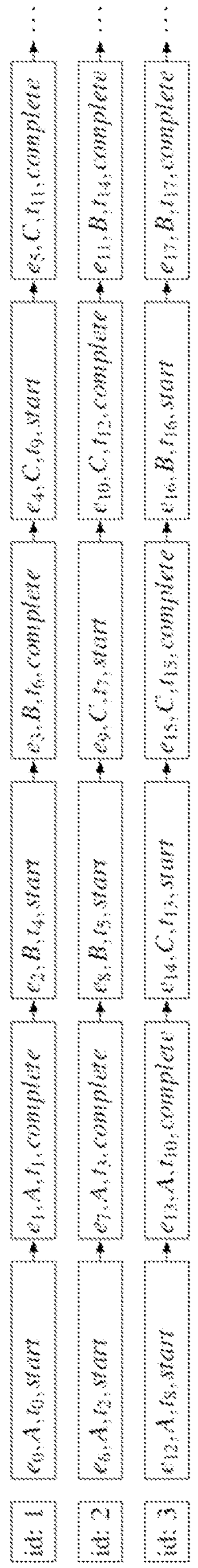
FIG. 2 illustrates a graphical example of the event logs from FIG. 1.

FIG. 2 illustrates a graphical example of the event logs from FIG. 1. Together, event logs 111, 112, 113 are referred to as event log L. In FIG. 2 the traces are visualised as a sequence of events.

Compliance Rules

Server 104 may employ a regulatory framework to check compliance of the event log combined from 111, 112, 113 to check that the requirements that a business process model needs to follow to be considered compliant. In one example, server 104 uses the Process Compliance Logic, introduced by Guido Governatori, and Antonino Rotolo. "Norm compliance in business process modeling." International Workshop on Rules and Rule Markup Languages for the Semantic Web. Springer, Berlin, Heidelberg, 2010, which is incorporated herein by reference. Conditional obligations are described below, to provide an intuition on the types of rules that can be formulated in the regulatory framework.

Definition 3 (Conditional Obligation) A local obligation e is a tuple $\langle o,r,t,d \rangle$, where $o \in \{a,m\}$ and represents the type of the obligation. The elements c,t and d are propositional literals in L, r is the requirement of the obligation, t is the trigger of the obligation and d is the deadline of the obligation.

The notation $c=O^{o}\langle r, t,d \rangle$ used herein to represent a conditional obligation.

The requirement, trigger, and deadline of a conditional obligation are evaluated against the states of a trace. Given a trace of a business process model and a conditional obligation, if a state of the trace satisfies the obligation's triggering element, then the obligation is set in force. Additionally, when an obligation is in force over a trace, and the deadline element is satisfied by a state of a trace, then the conditional obligation ceases to be in force.

Figure 3:
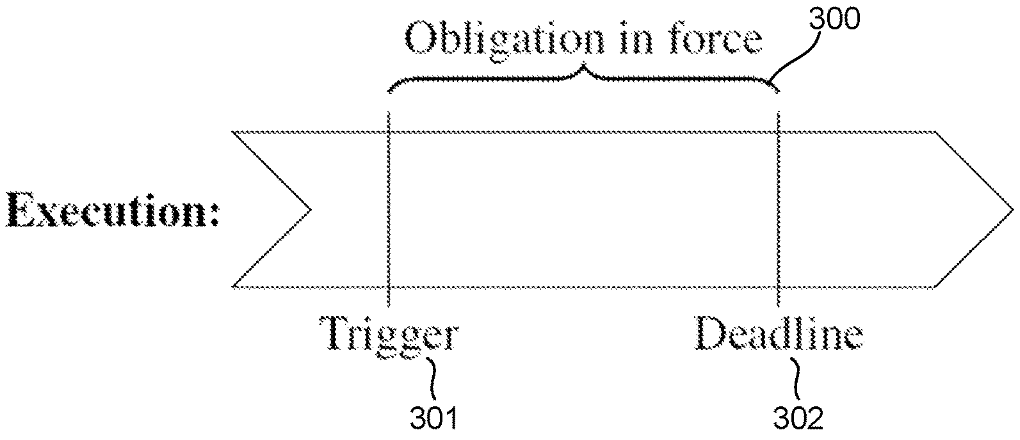
FIG. 3 graphically illustrates an in-force interval of a conditional obligation over a trace of a business process model between a trigger and a deadline.

FIG. 3 graphically illustrates the in-force interval 300 of a conditional obligation over a trace of a business process model between a trigger 301 and a deadline 302. It is noted that the conditional obligation is encoded in one or more evaluation functions. Therefore, the evaluation function is said to be executed for that in-force interval between the trigger 301 and the deadline 302*s*.

Note that when a conditional obligation is in force, then the requirement element of the obligation, i.e. the evaluation function, is evaluated within the in force interval 300 to determine whether the obligation is satisfied or violated in that particular in force interval. How the requirement element is evaluated depends on the type of the obligation. We consider two types of obligations, achievement and maintenance:

Achievement: When this type of obligation is in force, the requirement specified by the regulation must be satisfied by at least one state within the in force interval, in other words, before the deadline is reached. When this is the case, the obligation in force is considered to be satisfied, otherwise it is violated.

Maintenance: When this type of obligation is in force, the requirement must be satisfied continuously in every state of the in force interval, until the deadline is reached. Again, if this is the case, the obligation in force is satisfied, otherwise it is violated.

Potentially multiple in force intervals of an obligation can co-exist at the same time. However, multiple in force intervals can be fulfilled by a single event happening in a trace.

Logic Expressions

Deontic defeasible logic may be more expressive than just control flow and may impose more complicated constraints not only on variables in isolated traces, but also across traces. As such, evaluation of rules across different traces in an event log is considered.

Simply combining all possible permutations of traces to verify those rules is intractable, so there is a need for a different setup for a more efficient evaluation of a rule set R over multiple traces, where each trace may even originate from a different process definition.

Method for analysing an event log

Figure 4:
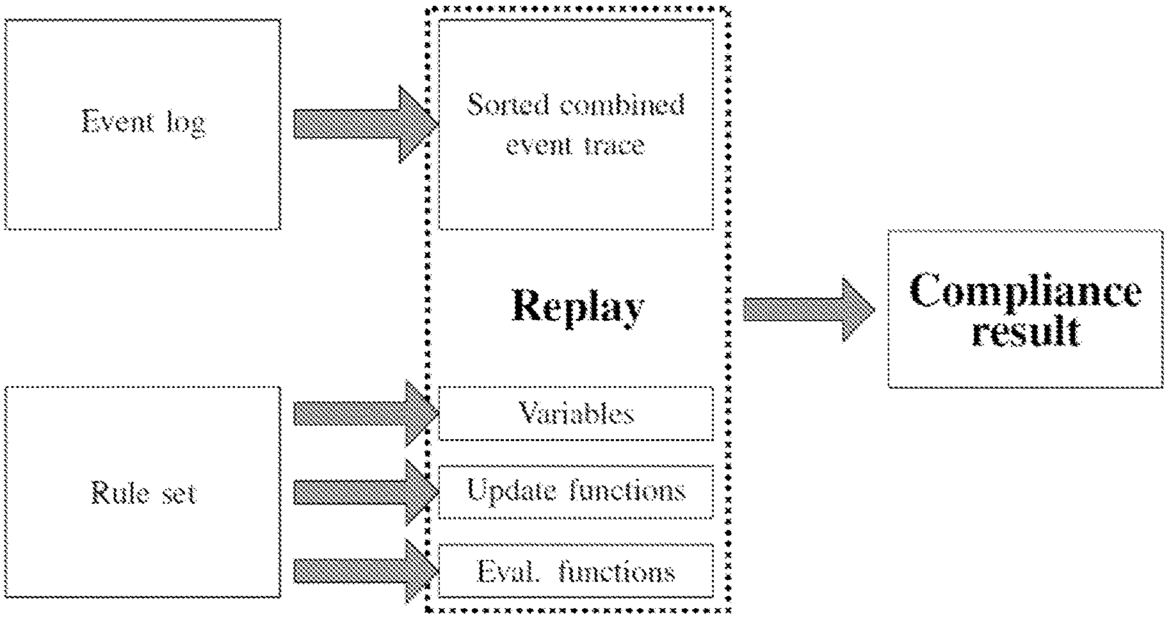
FIG. 4 shows a graphical overview of an example of the method disclosed herein.

FIG. 4 shows a graphical overview of an example of the method disclosed herein. The method consists of the following steps:

1. Order/sort the events from all traces in an event log as a continuous stream, ordered by timestamp.
2. Transform each rule $r_i$ in rule set R into:
   - a (set of) variables V
   - a set of update functions U that update each respective variable $v \in V$ after execution of the event
   - a set of corresponding evaluation functions F that can be evaluated given the set of input variables, such that: if $\forall f_j \in F$, $f_i \rightarrow$true then $r_i \rightarrow$true, else $r_i \rightarrow$false
3. Replay the newly created stream, updating each $v_j \in V$ after every replayed event using the update functions $\mu_j \in U$
4. Evaluate the relevant evaluation functions after a change of a variable.

It is noted that the set of variables V refers to data objects stored on computer memory (volatile or non-volatile). They may be declared as integer, float, string, boolean or other data objects.

A function refer to computer program code comprising one or more computer instructions grouped into a logical unit with one or more input variables and one or more output variables. These variables may be provided by reference or by value. The output variables the update functions U comprise the set of variables V. The set of variables V are the input variables of the evaluation functions.

FIG. 5 provides a graphical overview of the sequentialised events of the event log depicted in FIG. 1, which are represented as a single trace in FIG. 6. Note that server 104 still keeps track of the originating trace ("pid:") an event belongs to.

EXAMPLE

Original rules:

1. A manager can work on only two instances of event B at the same time.
2. A has to be completed before B is allowed to start.

Variables: $X_0$(array), $X_1$(bitstring), $X_2$(bitstring) Where variable $X_0$ is used in the computation of rule 1 and variables $X_1$ and $X_2$ are used in computation of rule 2.

Update functions:

e.name=B, e.lifecycle=start, e.resource=manager$\Rightarrow X_0$[e.mid]$=X_0$[e.mid]+1 e.name=B, e.lifecycle=complete, e.resource=manager$\Rightarrow X_0$[e.mid]$=X_0$[e.mid]−1 e.name=A, e.lifecycle=complete$\Rightarrow X_1=X_1 \vee 2^{Pid}$ e.name =B, e.lifecycle=start$\Rightarrow X_2=X_2 \vee 2^{Pid}$ Where $2^{Pid}$ is the number two to the power of the process instance identifier, which is ascending starting from 1. In other words, $2^{P}$is a bit-string with a one-hot encoding of the process instance. So the 'OR' operation ($\vee$) creates a bit string for the entire event log, where each bit represents the occurrence of a specific event for a trace. For example $X_1$ contains a set of bits that indicate for each bit whether for the respective $P_{id}$, A has been completed. As an example, an event log has 5 process instances: $P_{id}$ between 0 and 4. Then, server 104 creates the following bit string for $X_1$: 00000. If for $P_{id}$=1 A is completed, the bit string for $X_1$ would be: 00010. If then for $P_{id}$=2 A is also completed, the bit string for $X_1$ would be: 00110. If B starts for $P_{id}$=4, then the bit string of $X_2$ would be: 10000. Now if server 104 executes the evaluation function $X_1 \vee X_2=X_1$, we obtain a bit string $X_1 \vee X_2$: 10110, which is not equal to $X_1$=00110 and therefore not compliant (B was started before A was completed for $P_{id}$=4). In other words, in the evaluation functions below, a logical OR operation is then all that is required to evaluate whether the requirement has been fulfilled that A is before B. If not, the difference between the bit-strings will indicate the violating traces.

Evaluation functions:

$(\forall \text{mid})(X_0[\text{mid}] \leq 2)$ $X_1 \vee X_2 = X_1$

An excerpt of the evolution of the variables after each replayed event is shown FIG. 7.

The disclosed approach enables the use of more complicated logic to be checked and provides a highly efficient cross-trace and cross-process analysis. As such, advantages of this approach can be summarised as follows:

- Log compliance checking across different process instances
- Log compliance checking across different processes
- Automated rule conversion:
- Automated derivation of variables
- Automated transformation to update functions
- Automated transformation to evaluation functions
  - Automated replay and compliance evaluation using a combined trace

Update and Evaluation Functions

As described above, server 104 executes update functions on each log event. These update functions update variables, such as by assigning a new number value or Boolean value to these variables. The update functions may be arithmetic functions, such as including but not limited to:

- incrementing or decrementing a variable value;
- adding to or subtracting from a variable value; or
- performing an iterative function on the variable value.

It is noted that there are typically multiple variables that are being updated. But each variable is updated by different event types so that not every variable is updated at every event. For example, there may be 100 variables that are continuously updated by 1,000 events per second. In one example, the variables are updated after each log event is received and before the next log event is received.

Then, server 104 can execute evaluation functions to test whether the variable value corresponds to the rules. For example, this evaluation can be test for:

- equal to an exact value
- greater than a given lower threshold
- less than a given upper threshold Again, server 104 can evaluate the evaluation functions after receiving each log event, which enables a real-time compliance check.

In one example, there is exactly one evaluation function for each variable. However, there may be multiple evaluation functions for each variable. In further examples, there may be functions that combine two or more variables, such as, for example, to test that the sum of two variables is below a given threshold.

As shown in FIG. 1, server 104 implicitly keeps track of active tasks. For example, at $t_0$ there is an event with event label 'A' and lifecycle 'start'. So this indicates that task 'A' has now started. Server 104 keeps track of this running task by maintaining a variable that is indicative of the number of parallel instances of task 'A'. So at time $t^2$ another instance of task 'A' starts. However, at time $t^1$ the first instance was already completed so only one instance is running at one time. Through the use of variables and update functions, server 104 can keep track of the number of task despite them running on different computers 101 and 102, respectively, and may potentially overlap in execution.

So the way the server 104 represents tasks with a duration, is through start and stop events and then update variables at each start and stop event.

In some examples, server 104 connects the start event with a resource, such as connecting a manager to a contract start event. In this example, there may be two managers who can both work on 5 contracts but if the first manager has 6 contracts and the second manager has 2 contracts, the system would be not compliant.

It is noted that this approach significantly reduces complexities, such as compared to constructing an evaluation graph, because every variable would be connected to the event and the evaluation event. Further, the disclosed method prevents backtracing, which is also resource intensive.

It is further noted that server 104 operates on a mapping between regulations and variables, such that the variables represent the salient characteristics of the regulations and such that update functions and evaluation functions can be formulated on the variables to represent the regulations. In other words, regulations are transformed into a set of variables, which together would be sufficient to provide a proof value indicating compliance of that particular event log.

In further examples, each variable is connected to a specific event in the event log, which means there is a bridge between the event in the event log and the corresponding regulations. The update functions keeps that bridge updated, while progressing over the event log. The evaluation functions are a set of complicated procedures that extracts the truth value over the values to have real time update on compliance of event logs against regulation.

In one example, the regulation is formulated in a logic form, such as deontic defeasible logic. The regulations could represent business rules, but are transformed to a logic form. These regulations can come from contract, business rules, or other sources.

In further examples, the rules may comprise atomic literals that are the same as the variables to be updated by the update functions. In other examples, however, the atomic literals in the rules are not the same as the updated variables.

In one example, the transformation comprises obtaining variables from a rule, manual mapping to determine the updated functions where event logs do not have standardised way of presenting variables. In other cases, where the use of variables is standardised, the transformation from rules to update functions and evaluation functions can be automated.

In further example implementations, all variables are global over all processes, so that any variable that is updated as a result of a log event from a first process, can then be further updated as a result of a subsequent log event from a second process.

Evaluation Function/predicates

In one example, evaluation functions are modelled by evaluation predicates. An evaluation predicate captures the occurrence of a condition by means of a Boolean function that returns true when the condition is fulfilled and false otherwise. As such, the evaluation function is represented by an evaluation predicate that occurs at a specific point in time and that can be recorded together with that time.

Evaluation predicates may be defined on a graph-like structure with logical connectives to evaluate complex conjunctions in a single iteration. This means that server 104 stores the graph-like structure and evaluates the graph-like structure for each event occurrence in order to calculate the value associated with the evaluation predicate.

As a result of using a graph-structure, evaluation predicates may have precedence among each other. That is, a certain evaluation predicate may need to occur after another evaluation predicate. Further, evaluation predicates may also have restrictions. For example, a certain evaluation predicate may only be allowed to be considered once another evaluation predicate holds true.

Finally, evaluation predicates allow the notion of deferred variables. This means that the required value of the variable is not known during design time and is to be obtained from the execution during evaluation.

Method

Figure 8:
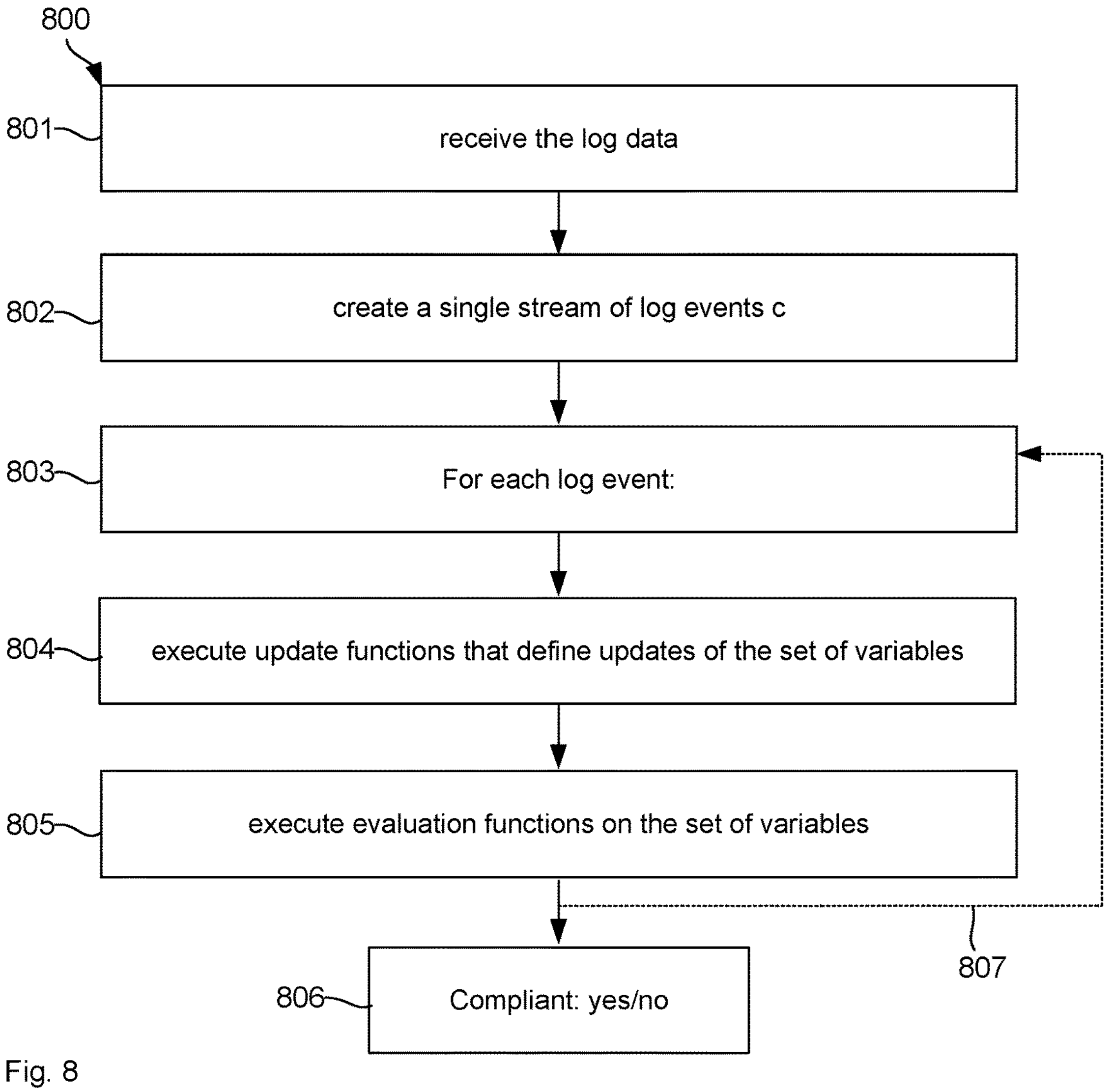
FIG. 8 illustrates a method for analysing log data.

FIG. 8 illustrates a method 800 for analysing log data. The method 800 may be performed by server 104. In that example, server 104 receives 801 the log data, which comprises multiple log events from multiple different processes. The log data may be in a text file, database or in the form of a data pipe or stream. Each of the multiple log events is associated with an event time indicative of when an event occurred that caused the generation of that log event.

Server 104 creates 802 a single stream of log events comprising the multiple log events from the multiple different processes. The single stream of log events is sorted by the associated event time. This single stream (or 'trace') may be stored as a new text file, or may overwrite the original log file or may be kept on volatile storage, such as RAM or as database entry, such as records of a SQL database. In further examples, the original log data may be stored in any order in the SQL database and server 104 sorts the log events by issuing a 'SELECT * FROM logdata' command including an 'ORDER BY time stamp' directive.

Server 104 iterates 803 over the single stream of log events, such as by calling a 'next' routine of a collection data object. For each log event, server 104 executes one or more update functions that define updates of the set of variables based on the log events. Thereby, server 104 calculates an updated value of one or more of the set of variables. For example, server 104 increments or decrements a variable that maintains the number of running instances of a particular process. At this point in method 800 server 104 may loop back to obtaining the next log event and iterate over only step 804 of executing the update function and then executes 805 one or more evaluation functions on the set of variables to determine compliance of the log data.

In most examples, however, server 104 executes 805 the one or more evaluation functions after each update step 804. That is, there is iteration loop 807 shown as a dotted line which iterates from after executing the evaluation functions back to obtaining the next log event 803. This means that server 104 executes the evaluation function after processing each log event, that is, after each execution of the update function. This also means that an up-to-date compliance value is available after each log event.

The one or more evaluation functions represent compliance rules based on the set of variables. For example, the evaluation function evaluates to TRUE if a condition is met, such as the number of running instances of a particular process is below an upper threshold. If there are multiple evaluation functions, the overall operation is compliant if all evaluation functions evaluate to TRUE 806. In other words, the evaluation value of all evaluation functions are 'AND' connected to create a final TRUE/FALSE or 0/1 compliance value.

It is noted that a hybrid version is also possible where for some log events the iteration loops back after the update step 804 and for other log events the iteration loops back after the evaluation function 805. This may be used to adjust the processing load in the sense that the number of evaluations can be reduced. For example, if the rate of log event generation is higher than a human can perceive a change in compliance value, such as a generation of log events of 1,000 per second, server 104 may execute the evaluation function at 805 once every second or after executing the update functions for 1,000 log events.

Applications

The disclosed method may be used in a variety of different applications. For example, the disclosed method may be used to analyse logs of computer systems executing an operating system, such as iOS, Windows or Linux. In this scenario, there may be a common log file, stored persistently on non-volatile storage and new events are appended to the log file. More particularly, multiple processes run on the computer system (such as by executing different binaries of software programs) and each process appends log events to the common log file. Each process may append start and stop events and server 104 processes these as described above.

In a further application scenario, there may be a complex high-reliance system, such as an aircraft or a nuclear power plant. Again, in these scenarios, there is a large number of interconnected modules that each generate log events. With the methods and systems disclosed herein, these operations can be monitored in real time and a granular assessment of proper functioning guaranteed. For example, there may be evaluation functions for different categories of events, such as, for an aircraft, there may be a set of evaluation functions for only the engines, such that the compliance of engines with respect to their operating ranges can be assessed separately from in-cabin systems, for example. It is also possible to formulate complicated compliance conditions using the conditional obligation concept described above.

Computer System

Figure 9:
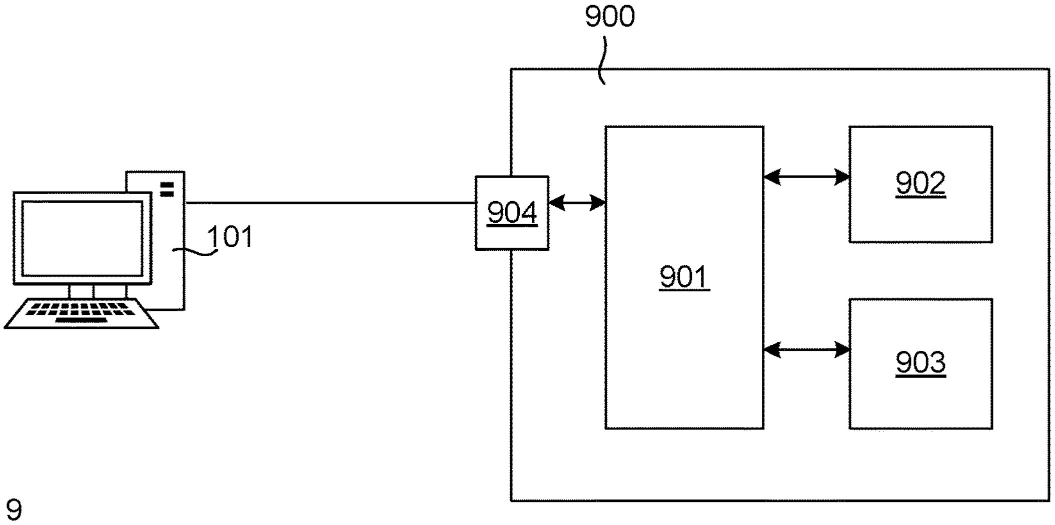
FIG. 9 illustrates a computer system for monitoring compliance of another system.

FIG. 9 illustrates a computer system 900 for monitoring compliance of another system 101. In that sense, computer system 900 is an example implementation of processing server 104 in FIG. 1. Computer system 900 monitors compliance of system 101 by analysing log data. Computer system 900 comprises a processor 901, program memory 902, data memory 903 and a communication port 904. Processor 901 is configured to perform method 800 in FIG. 8.

More particularly, program memory 902 is a non-transitory memory with program code stored thereon. The program code is a software implementation of method 800 and may be stored in compiled form as a binary or in another interpretable format. Processor 901 reads the program code, which includes instructions for processor 901 to perform method 800. It is noted that log data, log events, update functions and evaluation functions as well as variables are data structures that are stored either on program memory 902 (for functions) or data memory 903 (for variables).

Processor 901 receives the log data comprising multiple log events from multiple different processes, each of the multiple log events being associated with an event time. Processor 901 then creates a single stream of log events comprising the multiple log events from the multiple different processes, and stores the stream on data memory 903.

The single stream of log events is sorted by the associated event time. Processor 901 then iterates over the single stream of log events. For each log event, processor 901 executes one or more update functions that define updates of the set of variables based on the log events to calculate an updated value of one or more of the set of variables. Finally, processor 901 executes one or more evaluation functions on the set of variables to determine compliance of the log data. The one or more evaluation functions represent compliance rules based on the set of variables.

Processor 901 may also perform an action in response to the determined compliance. For example, processor 901 may initiate a mitigation action when non-compliance is detected, such as by raising an alarm or sending an alert message, or stop the operation of the other system 101 altogether.

Graph Structure

The following disclosure provides: 1) how the graph-like structure is defined and; 2) the method of interpreting the structure to decide whenever the modelled rule is compliant.

The graph structure is given as,

- A set of collections, each collection comprising a set of update functions, evaluation functions and variables where each collection is grouped by a single variable type. For example, a collection may contain all update functions and evaluation functions that update a variable X.
- A set of logical operators. Predominately AND/OR, however, this may also include variations of these such as XOR.
- A precedence relation defined over collections and logical operators (i.e., edges between logical nodes and collection nodes).
- A restriction relation defined over collections that describe whether a collection should be considered (at the point in time) once another collection has "occurred".
- An entry point that describes what nodes should be initially considered.

A precedence relation is not reflexive and each collection is only related to a logical operator. For the sake of convenience, it is allowable to feature an edge directly between two collections. This is purely syntactic and can be interpreted implicitly as having an AND operator as a middleman.

Here, the "occurrence" of a collection is defined as the point in time when a variable is updated to a value that satisfies the evaluation predicate and is no longer in force (i.e., we are looking for an event B and then observe an event B). A subtlety to note is that maintenance rules must be interpreted differently. For example, the "occurrence" of a collection that is compliant when a bank account balance is positive is meaningless if the account is always positive. In this case, the collection will be in force until the point of evaluation.

It may be desirable to consider the negation of the occurrence of a collection as, for example, if a rule requires some reparation event to occur, then we do not want to record the variable's data twice.

Each node in the graph structure may represent one of two types: a logical operator or a collection. Both types may be connected interchangeably through a precedence relation. A collection can be defined within multiple nodes. Each collection-based node may represent the negation of the collection. That is, if the representative collection occurs, we take the negation of the evaluation predicates as the result. From the entry point of the graph, the depth of a collection-based node establishes a precedence among each other. That is, certain collections may need to occur after another collection.

The graph-like structure is evaluated left-to-right from the given entry point and continues until the graph-like structure is pronounced as "incompliant" or "compliant". Such outcomes are a consequence of whether the variable/s inside each collection satisfy all respective evaluation predicates, no longer in force, and satisfy the graphs logical structure.

Graph Example 1

Figure 10:
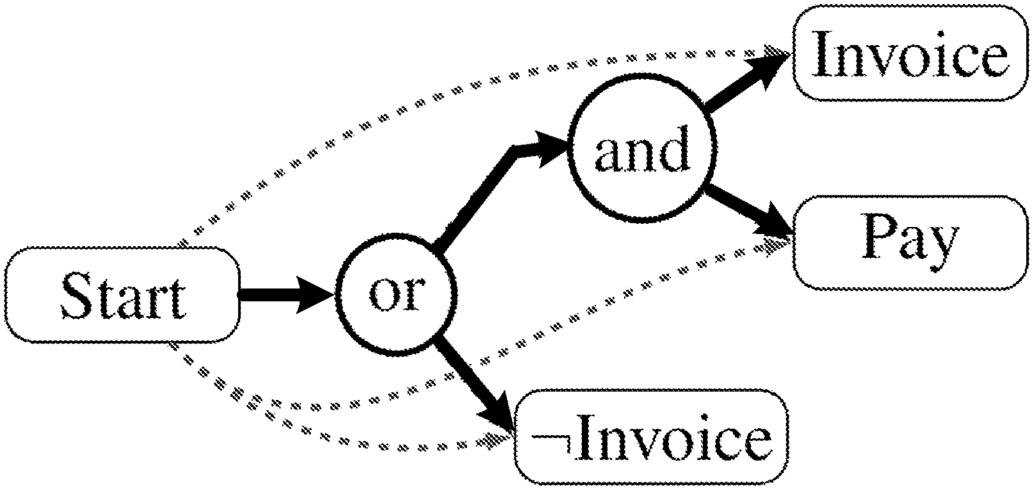
FIG. 10 illustrates an example graph for the hypothetical rule InvoicePay

FIG. 10 provides an example of a graph structure where the "Start" node represents the entry point, nodes "Invoice" and "Pay" are collections, nodes "or" and "and" are logical connectives, each black solid line represents a precedence relation and each dotted line represents a restriction relation.

Note that in FIG. 10, each restriction relation is considered from the entry point. It is common to omit these lines for the sake of simplicity, and has been done so in FIG. 11.

Hypothetically, one may have the following collections:

Invoice

Variable: $X_0$ (boolean)

Update function: e. name=invoice, e.lifecycle=complete$\Rightarrow X_0$=true

Evaluation function: $X_0$=true

Pay

Variable: $X^1$(float)

Update function: e.name=payment, e.lifecycle=complete$\Rightarrow X_1=X_1$+e.amount Evaluation function: $X_1=100$ This example is small and is analogous to the evaluation function $\phi=\neg X_0 \vee (X_1=100)$. However, a difference to note is that $\phi$ is checked on every single update to $X_1$ (pay), and so there is a redundant check whether $\neg X_0$ is true every time $X_1$ changes. This is inefficient if for example there are several redundant checks being made on most or all events. In this case, a graph structure can circumvent this issue by: 1) listening to when a collection has occured, and 2), at this point of occurence, traversing the graph to check compliance of the rule by checking related collections.

Furthermore, once a collection has occurred, the set of update functions contained within the collection can be discarded, further reducing the number of checks on each event. Similarly, there are cases where the currently used variables pertaining to each collection can be optionally discarded as well.

Another benefit is that such graph structures can be easily manipulated to modify or extend a rule.

Graph Example 2

Figure 11:
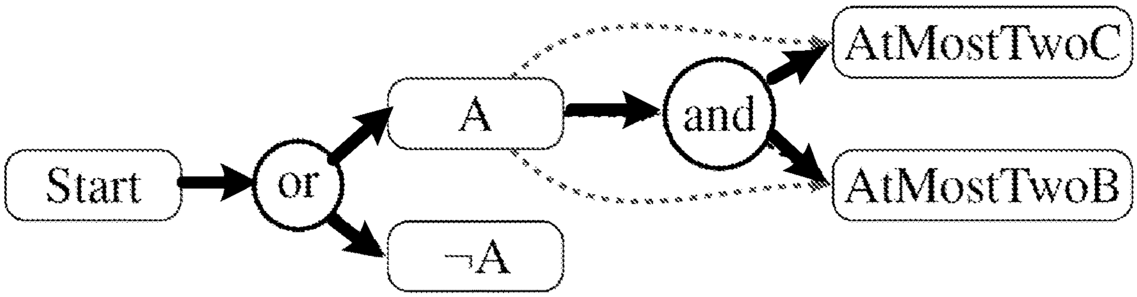
FIG. 11 illustrates an example graph for the rules given herein.

FIG. 11 illustrates an example where the graph cannot be reduced to a single evaluation function without using more complex update functions (i.e., update functions that depend on multiple variables). This example contains three collections: "A", "AtMostTwoB" and "AtMostTwoC" and is similar to the example given herein. The red dotted lines represent a restriction relation between collections "A" and "AtMostTwoB"/"AtMostTwoB" and specifies that these collections should only be updated once collection "A" has occured. The graph structure encodes the following rules:

Rules

If event A occurs then a manager can work on at most two instances of event B at the same time. Only count the event B's that occur after event A.

If event A occurs then a manager can work on at most two instances of event C at the same time. Only count the event B's that occur after event A.

In this case, if collection "A" has not occured then both collections "AtMostTwoB" and "AtMostTwoB" can be ignored, reducing the number of updates required. Therefore, we can iteratively traverse the graph as a means to keep in memory what collections are relevant and need to be considered.

Without using such a structure, one may formulate the update functions as follows:

Variables: $X_0$ (boolean), $X_1$ (integer), $X_2$ (integer)

Update functions:

e.name=A,e.lifecycle=complete$\Rightarrow X_0$=true e.name=B,e.lifecycle=start,$X_0$=true$\Rightarrow$=$X_1=X_1+1$ e.name=B,e.lifecycle=complete,$X_0$=true$\Rightarrow X_1=X_1-1$ e.name=C,e.lifecycle=start,$X_0$=true$\Rightarrow X_2=X_2+1$ e.name=C,e.lifecycle=complete, $X_0$=true$\Rightarrow$=$X_2=X_2-1$ Evaluation function: $\neg X_0 \vee (X_1 \leq 2 \wedge X_2 \leq 2)$ However, it can be seen that if $X_0$ is false, then the last four update functions (i.e., ones updating $X_1$, $X_2$) do not need to be checked. These functions are checked on every event which leads to a lot of redundant checks.

Scaling the Graph Over a Domain

The graph structure enables scaling over a domain of instances. An exmaple case is to consider all processes as the domain to scale over. If we consider the example herein, each manager corresponds to a unique process execution. However, since the method has all events sorted as a continuous stream, the method can consider other domains as well. For instance, a rule may want to verify that for each day, the maximum number of staff on a worksite must be less than 20. In this case, we want to verify the rule for each day and hence our domain is the set of all relevant days.

Figure 12:
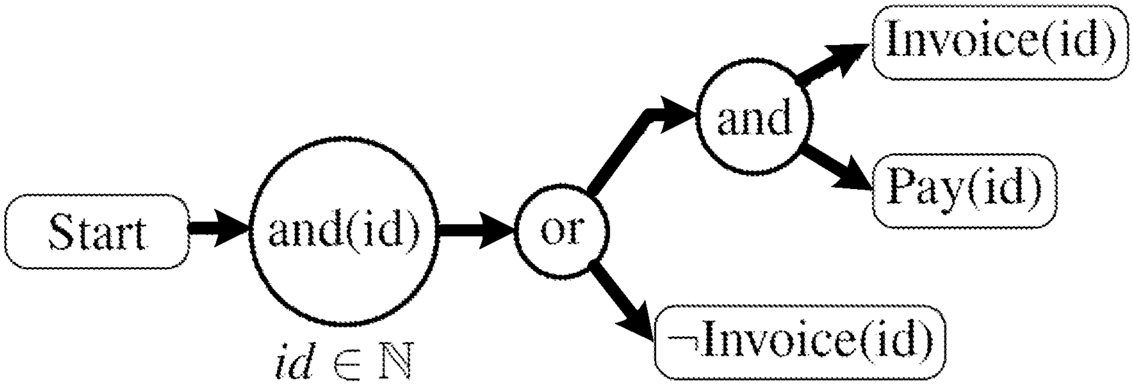
FIG. 12 illustrates an example graph for the hypothetical rule InvoicePay scaling over the domain of invoice id's.

Condensed notation has been developed to support this notion. In continuation of Graph Example 1, we may want to verify the rule for every invoice instance that is created. The graph representation for this is illustrated in FIG. 12. It is important to note that this notation is purely syntactic and represents an "infinite" conjunction of copies of FIG. 10, one for each id.

In terms of implementation, this is viewed as creating a new instance for every invoice id. The complexity of this problem does increase when processor 901 considers more complex domains and have a collection that occurs for part of this domain. For example, consider the domain (branch_id,manager_id) and a collection that updates a single branch—which is a one-to-many relationship with all managers in the branch. It is hard to guess at what "copies" pairs should be created, especially if we require some preemptive calculation.

However, since this notation is purely syntactic, these additional complexities should already be captured by the graph structure definition.

Method of Traversing the Graph Structure

The method of traversal is an adaption of the method presented herein. A collection is a set of update functions, evaluation functions and variables where each collection is grouped by a single variable type (as defined above). Given a graph structure that models a rule set, the method can be briefly described as follows:

1. Maintain a set of collections C that are to be considered during evaluation of the event log. From the entry point of the graph, add each collection related to the entry point by a restriction relation.
2. Replay the stream of events, updating each collection in C using their respective update functions.
3. Evaluate the relevant evaluation functions after a change of variable. If a node in the graph "occurs", that is, the node is pronounced true based on its underlying collection, perform the following:
   i. Update set C with the next set of collections that are required to be checked.
   ii. Traverse the graph structure and validate the graph's logical structure to assess compliance. If the graph structure is pronounced as provably compliant or incompliant, then terminate.
   iii. Otherwise, remove from C any collections that are no longer required to the search.
4. After completing iteration of the event log, repeat step 3 for any collection in C that is still undecided and whose in-force interval is specified as the point of evaluation.

The set of collections C may be an object of a computer program, such as a class or variable instance, which occupies space in volatile random access memory (RAM), such that the collections in C can be accessed quickly without resorting to persistent block-storage, which is slow and inefficient for the read and write access of small pieces of data. However, as the set C grows, it can quickly outgrow the amount of RAM available on a typical computer system. By dynamically adding and removing collections to and from C, it is possible to keep the amount of RAM that is used at any one time, within the limits of physical RAM that is available.

Merge

Instead of evaluating a set of rules R on a rule per rule basis (or in groups of rules), R can be merged into a single graph structure. The graph structure allows for state or collections to be shared, reducing the need to duplicate any computation and memory. Furthermore, there may be cases where update functions can be modified/decoupled to share state or collections more efficiently.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for determining compliance of multiple processes performed by a computer system, the method comprising:

receiving a single stream of log events comprising multiple log events from multiple different process executions, wherein the single stream of log events is sorted by associated event times of the multiple log events, and at least one of multiple tasks occurs in two or more of the multiple different process executions;

iterating over the single stream of log events according to the associated event time by, at each iteration, for the respective log event, executing one or more update functions each comprising at least one mathematical operator that acts on a set of numerical variables comprising at least one cross-execution numerical variable, the one or more update functions defining updates of the set of numerical variables according to the respective log event, the at least one cross-execution numerical variable being associated with the at least one of the multiple tasks occurring in two or more of the multiple different process executions, the one or more update functions comprising an update function that includes the at least one mathematical operator that acts on the at least one cross-execution numerical variable to calculate an updated numerical value of the at least one cross-execution numerical variable, and the at least one mathematical operator of the update function encoding a status of the task associated with the at least one cross-execution numerical variable into the updated numerical value; and after iterating over the single stream of log events, executing one or more evaluation functions comprising the at least one mathematical operator that acts on the set of numerical variables to determine compliance of the multiple processes based on the updated numerical value, the one or more evaluation functions representing compliance rules based on the set of numerical variables including the at least one cross-execution numerical variable, at least one of the compliance rules being based on the at least one of the multiple tasks occurring in the two or more of the multiple different process executions.

2. The method of claim 1, wherein the method comprises executing the one or more evaluation functions for each log event.

3. The method of claim 1, wherein the method comprises performing the steps of creating, iterating and executing in real-time to determine compliance while receiving further log data.

4. The method of claim 1, wherein the compliance rules comprise a conditional obligation or are defined across multiple processes.

5. The method of claim 1, wherein the update functions define an update of one of the set of numerical variable in response to log data from multiple processes or multiple process instances.

6. The method of claim 1, wherein the log data comprises log data generated by a computer system executing an operating system, and the log data is generated by different processes executed by the operating system.

7. The method of claim 1, wherein the multiple log events comprise start log events that indicate the beginning of one of the multiple tasks and stop events that indicate the end of the one of the multiple tasks.

8. The method of claim 1, wherein the one or more evaluation functions are represented by evaluation predicates.

9. The method of claim 8, wherein the evaluation predicates are associated with a logical value indicating a predetermined occurrence of log events.

10. The method of claim 8, wherein the evaluation predicates are defined on a graph structure, and wherein the method further comprises determining a set of evaluation functions or update functions that require execution based on the graph structure and executing only the set of evaluation functions or update functions in that iteration.

11. The method of claim 10, wherein the method further comprises traversing the graph structure to assess compliance by, at each step:

adding evaluation functions and update functions to the set, executing the evaluation functions and update functions in the set, and removing one or more of the evaluation functions and one or more of the update functions from the set as defined by the graph structure.

12. The method of claim 10, wherein the set is stored on volatile computer memory.

13. The method of claim 8, wherein the evaluation predicates are defined on a graph structure, and wherein the graph structure defines a precedence among the evaluation predicates, and the graph structure represents a combination of the state that has been checked and the evaluation functions or update functions that require execution.

14. The method of claim 1, further comprising:

generating an instance of an update function or evaluation function or both to represent a rule;

storing the generated instance in volatile computer memory;

executing the generated instance in the volatile computer memory; and discarding or overwriting the generated instance in the volatile computer memory while further determining compliance.

15. The method of claim 1, wherein the one or more evaluation functions are executed for an in-force time interval defined by the rules.

16. A non-transitory computer readable medium with program code stored thereon that, when executed by a computer, causes the computer to perform the method of claim 1.

17. The method of claim 1, wherein each of the set of numerical variables is one of: an integer; a float; a string; a Boolean; and an array.

18. The method of claim 1, wherein the at least one cross-execution numerical variable is a binary bit string and each of the at least one mathematical operator is a Boolean operator.

19. The method of claim 17, wherein the at least one cross-execution numerical variable encodes the status of the associated task using one-hot encoding.

20. A computer system for determining compliance of multiple processes performed by another computer system, the computer system comprising a processor configured to:

receive a single stream of log events comprising multiple log events from multiple different process executions, wherein the single stream of log events is sorted by associated event times of the multiple log events, and at least one of multiple tasks occurs in two or more of the multiple different process executions;

iterate over the single stream of log events according to the associated event time by, at each iteration, for the respective log event, executing one or more update functions each comprising at least one mathematical operator that acts on a set of numerical variables comprising at least one cross-execution numerical variable, the one or more update functions defining updates of the set of numerical variables according to the respective log event, wherein the at least one cross-execution numerical variable is associated with the one of the multiple tasks occurring in the two or more of the multiple different process executions, the one or more update functions comprises an update function including the at least one mathematical operator that acts on the at least one cross-execution numerical variable to calculate an updated numerical value of the at least one cross-execution numerical variable, and the at least one mathematical operator eross trace variable encodes a status of the task associated with the at least one cross-execution numerical variable into the updated numerical value; and after iterating over the single stream of log events, execute one or more evaluation functions comprising the at least one mathematical operator that acts on the set of numerical variables to determine compliance of the multiple processes based on the updated numerical value, the one or more evaluation functions representing compliance rules based on the set of numerical variables including the at least one cross-execution numerical variable, at least one of the compliance rules being based on the at least one of the multiple tasks occurring in the two or more of the multiple different process executions.

* * * * *